(12) United States Patent
Zhang et al.

(10) Patent No.: US 7,848,099 B1
(45) Date of Patent: Dec. 7, 2010

(54) HARD DISK DRIVE HOLDER

(75) Inventors: Guang-Yi Zhang, Shenzhen (CN); Zhe Zhang, Shenzhen (CN); Yi-Wei Fan, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/616,746

(22) Filed: Nov. 11, 2009

(30) Foreign Application Priority Data

Jul. 10, 2009  (CN) .................... 2009 1 0304216

(51) Int. Cl.
*H05K 7/00* (2006.01)
*A47B 95/02* (2006.01)
*A47B 95/00* (2006.01)
*H02H 3/00* (2006.01)
*H01R 13/62* (2006.01)
*G11B 33/02* (2006.01)
*B65D 85/00* (2006.01)

(52) U.S. Cl. .................. 361/679.38; 312/332.1; 312/333; 360/97.01; 439/327; 369/75.11; 206/701

(58) Field of Classification Search .......... 361/683, 361/684, 685, 686, 679.17, 679.3, 679.33, 361/679.34–679.41; 439/60, 151–160, 327, 439/328, 33; 360/97.01, 98.01, 137, 137 D; 312/332.1, 333, 331, 223.1, 223.2; 165/104.33
See application file for complete search history.

(56) References Cited

U.S. PATENT DOCUMENTS

| | | | | |
|---|---|---|---|---|
| 6,490,153 B1 * | 12/2002 | Casebolt et al. | ........ | 361/679.33 |
| 6,798,650 B2 * | 9/2004 | Reznikov et al. | ....... | 361/679.33 |
| 7,480,137 B1 * | 1/2009 | Jyh | ........................ | 361/679.33 |
| 7,511,953 B2 * | 3/2009 | Tao et al. | ............... | 361/679.39 |
| 2004/0074082 A1 * | 4/2004 | Kim et al. | ................ | 29/603.03 |
| 2005/0237707 A1 * | 10/2005 | Connelly et al. | ............ | 361/685 |

* cited by examiner

*Primary Examiner*—Zachary M Pape
*Assistant Examiner*—Jerry Wu
(74) *Attorney, Agent, or Firm*—Zhigang Ma

(57) ABSTRACT

A hard disk drive holder includes main body, spindle slidably mounted to the main body, handle rotatably connected to the main body via the spindle, and hook slidably mounted to the main body. The handle includes claw and locking tongue. The handle rotates between closed and opened positions. When the handle is at closed position, if the spindle slides from a first position to a second position, the locking tongue gradually extends out of the main body. When the handle rotates to closed position, if the spindle isn't at first position, the claw engages with a blocking piece of the hook and compels the hook to slide from a third position towards a fourth position until the claw goes over the blocking piece. A first spring biases the spindle to second position. A second spring biases the handle to opened position. A third spring biases the hook to third position.

20 Claims, 5 Drawing Sheets

HARD DISK DRIVE HOLDER

CROSS-REFERENCE TO RELATED APPLICATION

The present application is related to a copending U.S. patent application, titled "HARD DISK DRIVE HOLDER", with the application Ser. No. 12/613,449, assigned to the same assignee as the present application.

BACKGROUND

1. Technical Field

The present disclosure relates to a hard disk drive (HDD) holder.

2. Description of Related Art

An HDD holder is used to hold an HDD. The HDD holder typically includes a main body and a handle having opposite first and second ends, wherein the first end is rotatably mounted to the main body, a locking tongue extends from the first end, and a hook extends from the second end. A computer chassis typically includes a receiving portion for receiving the HDD holder. The receiving portion includes opposite sidewalls for mounting the HDD holder therebetween, wherein one of the sidewalls defines a locking hole. When the HDD holder is received in the receiving portion, the handle is rotated to the main body to be closed. The hook of the handle will hook the main body of the HDD holder, and the locking tongue will extend in the locking hole of the receiving portion. Therefore, the HDD holder can be securely locked in the receiving portion successfully. However, when the receiving portion is manufactured, there is usually an error of a distance between the sidewalls of the receiving portion, which may lead the locking tongue of the handle cannot be locked in the locking hole of the receiving portion.

In order to solve the above-mentioned problem, a new frame appears in industry to improve the HDD holder. In the new frame, the locking tongue is elastically mounted to the first end of the handle, and thereby the distance error of the sidewalls of the receiving portion can be offset. However, this new frame causes a new problem that the hook of the handle can hook the main body of the HDD holder no matter the locking tongue extends in the locking hole or abuts against the corresponding sidewall of the receiving portion. In other words, when the HDD holder is received in the receiving portion, if the HDD holder is not located at the right position to be locked, the handle can still be closed, which will misguide a user to think that the installation of the HDD holder has already been done. Under this misguided thought, when the user operates or turns the receiving portion, the HDD may fall off the receiving portion and the HDD may be damaged.

DETAILED DESCRIPTION

Figure 1:
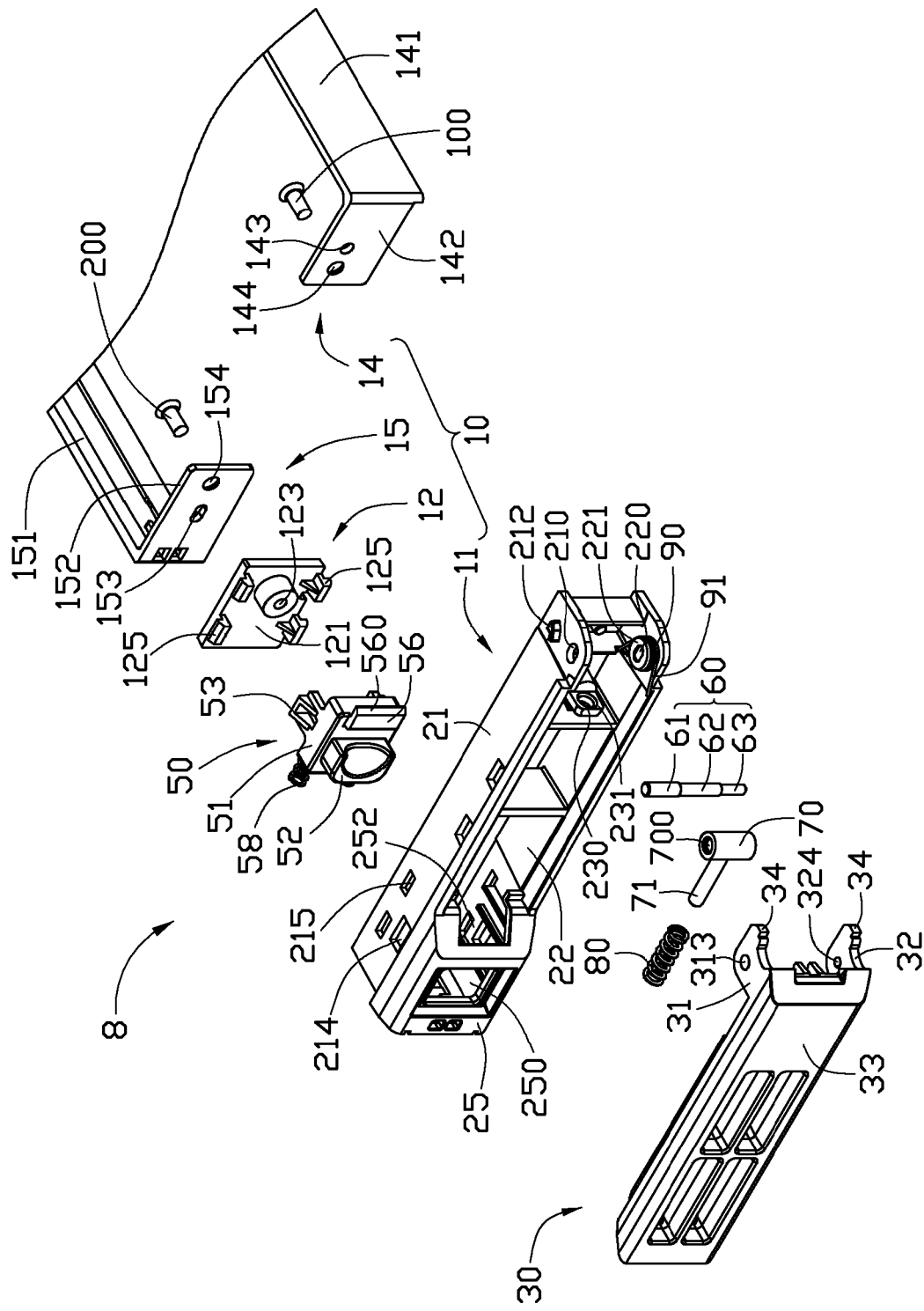
FIG. 1 is an exploded, isometric view of an embodiment of a hard disk drive (HDD) holder.
Figure 2:
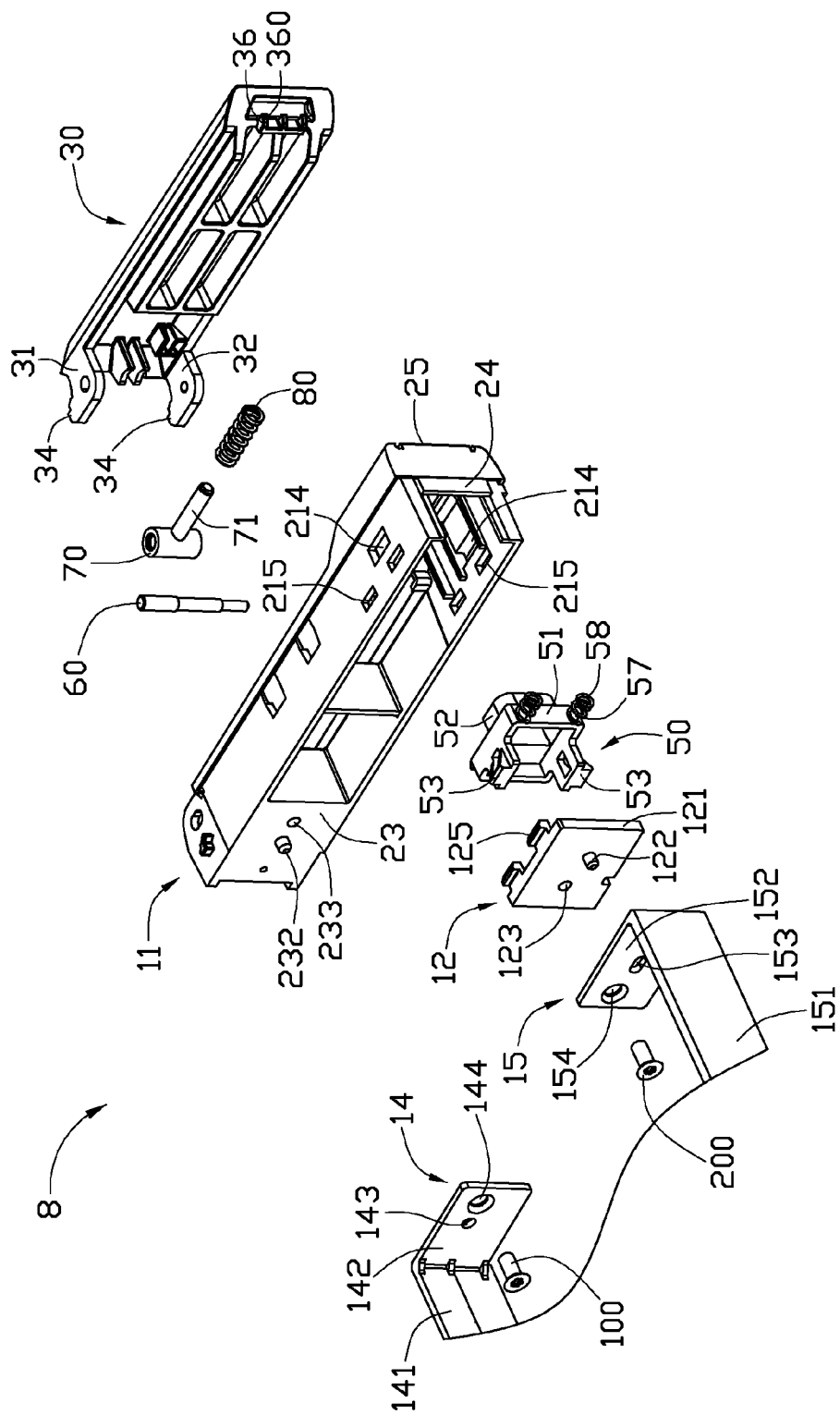
FIG. 2 is similar to FIG. 1, but viewed from another perspective.
Figure 3:
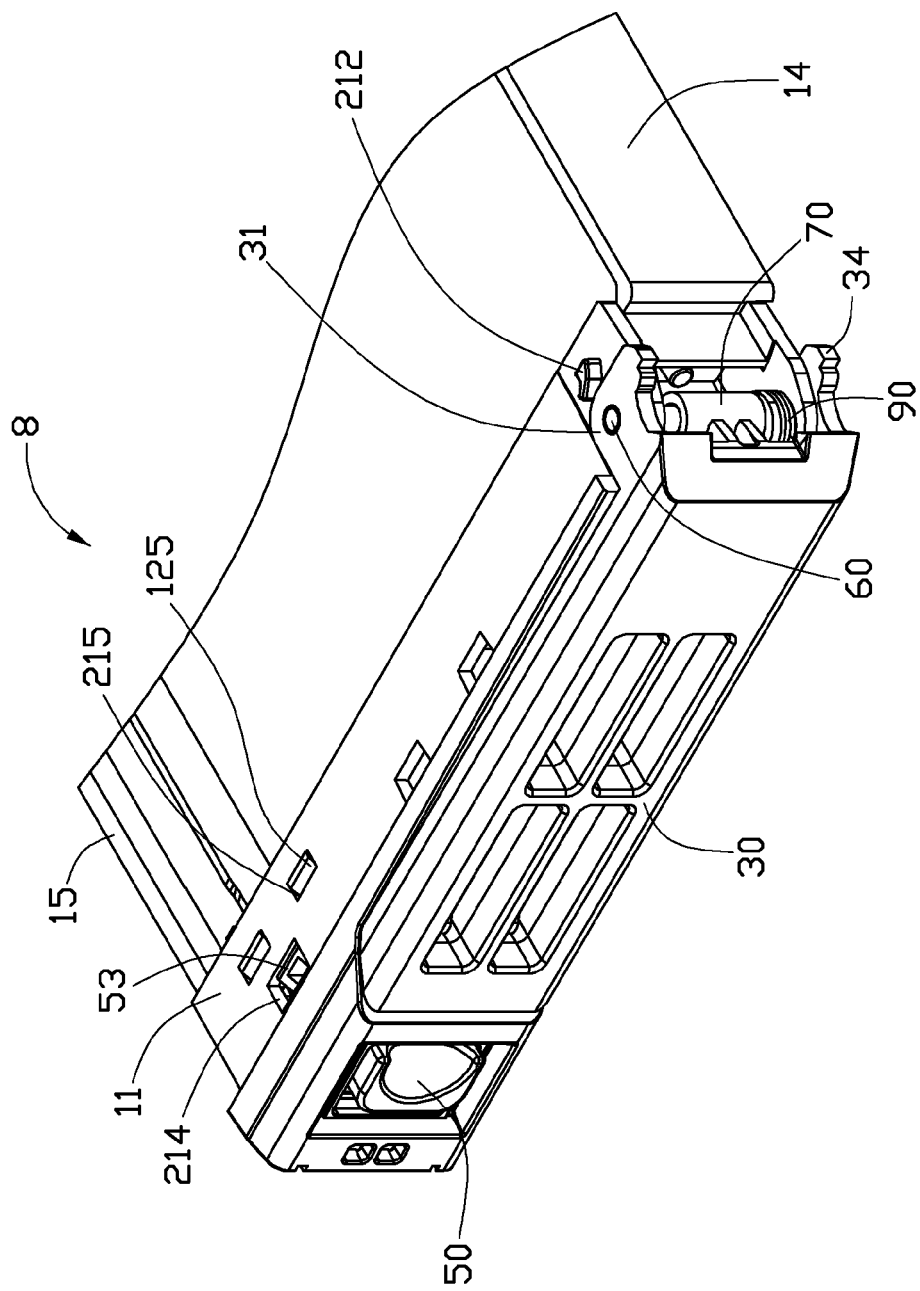
FIG. 3 is an assembled view of the HDD holder of FIG. 1.

Referring to FIGS. 1 to 3, an embodiment of a hard disk drive (HDD) holder 8 includes a main body 10, a spindle 60, a sleeve 70, a first elastic member 80, a second elastic member 90, a handle 30, a hook 50, and two third elastic members 58.

The main body 10 includes an elongated panel 11, a rear cover 12, a first arm 14, and a second arm 15.

The panel 11 includes an elongated top board 21, an elongated bottom board 22, a first connecting wall 23, a sidewall 24, and a second connecting wall 25 defining a first opening 250. A second opening 252 is defined in a right lateral side of the second connecting wall 25, opposite to the sidewall 24. The top board 21 and the bottom board 22 are opposite to each other. The first connecting wall 23 is connected between rear sides of the top board 21 and the bottom board 22, and is adjacent to a right end of the panel 11. The sidewall 24 is connected between left ends of top board 21 and the bottom board 22. The second connecting wall 25 is connected between front sides of the top board 21 and the bottom board 22, and is adjacent to a left end of the panel 11. The top board 21 defines a first elongated hole 210 adjacent to a right end of the top board 21, and extending through the top board 21. A longitudinal axis of the first elongated hole 210 is parallel with a longitudinal axis of the top board 21. A projection 212 extends from the top board 21, adjacent to the right end of the top board 21. The projection 212 is located between the first elongated hole 210 and the rear side of the top board 21. A round raised portion 221 extends from the bottom board 22 towards the top board 21, below the first elongated hole 210 of the top board 21. A second elongated hole 220 is axially defined in the raised portion 221 and extends through the bottom board 22. A longitudinal axis of the second elongated hole 220 is parallel with a longitudinal axis of the bottom board 22 and the longitudinal axis of the top board 21. The second elongated hole 220 aligns with the first elongated hole 210. A third elongated hole 214 is defined in each of the top board 21 and the bottom board 22, adjacent to the left end of the panel 11 and the second connecting wall 25. Longitudinal axes of the third elongated holes 214 are parallel with the longitudinal axes of the top board 21 and the bottom board 22. Two clipping holes 215 are defined in each of the top board 21 and the bottom board 22, located between the corresponding third elongated hole 214 and the corresponding rear side of the top board 21 or the bottom board 22. A projecting piece 231 extends forwards from the first connecting wall 23, opposite to the sidewall 24. A guiding hole 230 is defined in the projecting piece 231. A first locating pole 232 extends backwards from the first connecting wall 23. A first mounting hole 233 is defined in the first connecting wall 23, adjacent to the first locating pole 232.

The rear cover 12 includes a rectangular board 121. A projection (not labeled) extends forwards from the board 121, and defines a second mounting hole 123 through the board 121. A second locating pole 122 extends backwards from the board 121, adjacent to the second mounting hole 123. Two clipping portions 125 extend from each of top and bottom sides of the board 121.

The first arm 14 is L-shaped and includes an elongated first main portion 141 to be attached to a first side of an HDD (not shown), and a first mounting portion 142 perpendicularly extending from a front end of the first main portion 141 to be attached to a right part of a front end of the HDD. A round first locating hole 143 and a round first through hole 144 are defined in the first mounting portion 142.

The second arm 15 is L-shaped and includes an elongated second main portion 151 to be attached to a second side opposite to the first side of the HDD, and a second mounting portion 152 perpendicularly extending from a front end of the second main portion 151 to be attached to a left part of the front end of the HDD. An elongated second locating hole 153 and a round second through hole 154 are defined in the second mounting portion 152.

The spindle 60 is cylindrical and includes three coaxial segments. It includes a first segment 61, a second segment 62, and a third segment 63, wherein the second segment 62 is connected between the first segment 61 and the third segment 63, the diameter of the first segment 61 is the greatest, and the diameter of the third segment 63 is the smallest.

The sleeve 70 axially defines a sleeve hole 700 corresponding to the second segment 62 of the spindle 60. A guiding post 71 extends from a circumference of the sleeve 70, perpendicular to the extending direction of the sleeve hole 700.

In the present embodiment, the first elastic member 80 is a pressure spring.

In the present embodiment, the second elastic member 90 is a torsion spring including two spring legs 91.

The handle 30 includes an elongated covering board 33. A first extension piece 31 extends backwards from a top of a right end of the covering board 33. A round first pivot hole 313 is defined in the first extension piece 31 corresponding to the first segment 61 of the spindle 60. A second extension piece 32 extends backwards from a bottom of the right end of the covering board 33, opposite to the first extension piece 31. A round second pivot hole 324 is defined in the second extension piece 32, corresponding to the third segment 63 of the spindle 60. A locking tongue 34 extends from each of the first extension piece 31 and the second extension piece 32, towards a direction opposite to a left end of the covering board 33. A plurality of claws 36 extends backwards from the left end of the covering board 33. Each claw 36 includes a slanting first guiding surface 360.

The hook 50 includes a rectangular main piece 51. An operating portion 52 extends from a front surface of the main piece 51. Two sliding blocks 53 extend backwards from upper and lower sides of the main piece 51, respectively. A blocking piece 56 extends from a right side of the main piece 51. The blocking piece 56 includes a slanting second guiding surface 560. Two holding poles 57 extend from a left side of the main piece 51.

In the present embodiment, the third elastic members 58 are pressure springs.

In assembling the HDD holder 8, the third elastic members 58 are fitted about the holding poles 57 of the hook 50, respectively. The hook 50 is mounted to the panel 11, wherein the operating portion 52 of the hook 50 is exposed through the first opening 250 of the second connecting wall 25 of the panel 11, the second guiding surface 560 of the hook 50 is exposed through the second opening 252 of the second connecting wall 25 of the panel 11, opposite ends of each of the third elastic members 58 abut against the sidewall 24 of the panel 11 and the main piece 51 of the hook 50 respectively, and the sliding blocks 53 of the hook 50 are slidably received in the third elongated holes 214 of the panel 11. The rear cover 12 is fixed to the panel 11, via the clipping portions 125 of the rear cover 12 being clipped in the clipping holes 215 of the panel 11, respectively. The first locating pole 232 of the panel 11 is inserted into the first locating hole 143 of the first arm 14. A fastener 100, such as a screw, is extended through the first through hole 144 of the first arm 14 and engaged in the first mounting hole 233 of the panel 11, to fix the first arm 14 to the panel 11. The second locating pole 122 of the rear cover 12 is inserted into the second locating hole 153 of the second arm 15. A fastener 200, such as a screw, is extended through the second through hole 154 of the second arm 15 and engaged in the second mounting hole 123 of the rear cover 12, to fix the second arm 15 to the panel 11. It is noted that the second locating hole 153 is designed to have a longitudinal axis perpendicular to the second main portion 151 of the second arm 15, which is able to offset a distance error between the second locating pole 122 and the second mounting hole 123 that may appears when the rear cover 12 is manufactured.

The second elastic member 90 is fitted about the raised portion 221 of the panel 11. The first elastic member 80 is fitted about the guiding post 71 of the sleeve 70. The sleeve 70 is disposed between the raised portion 221 of the panel 11 and the top board 21, and a free end of the guiding post 71 is extended through the guiding hole 230 of the projecting piece 231, to sandwich the first elastic member 80 between the projecting piece 231 and the sleeve 70. The first extension piece 31 of the handle 30 is disposed on the top board 21 of the panel 11, with the first pivot hole 313 of the handle 30 aligning with the first elongated hole 210, and the second extension piece 32 of the handle 30 is disposed under the bottom board 22 of the panel 11, with the second pivot hole 324 of the handle 30 aligning with the second elongated hole 220. The first pivot hole 313 and the second pivot hole 324 of the handle 30, the first elongated hole 210 and the second elongated hole 220 of the panel 11, and the sleeve hole 700 of the sleeve 70 are adjusted to be aligned, and cooperatively receive the spindle 60. It is noted that the first segment 61 of the spindle 60 is received in the first pivot hole 313 of the handle 30 and the first elongated hole 210 of the panel 11, and an engagement between the first segment 61 and the first pivot hole 313 and an engagement between the first segment 61 and the first elongated hole 210 are clearance fit; the second segment 62 of the spindle 60 is received in the sleeve hole 700 of the sleeve 70, and an engagement between the second segment 62 and the sleeve hole 700 is interference fit; the third segment 63 of the spindle 60 is received in the second elongated hole 220 of the panel 11 and the second pivot hole 324 of the handle 30, and an engagement between the third segment 63 and the second elongated hole 220 and an engagement between the third segment 63 and the second pivot hole 324 are clearance fit. Therefore, the assembling for the HDD holder 8 is done, and the HDD holder 8 is ready to mount the HDD between the first arm 14 and the second arm 15. It is noted that opposite ends of the first elastic member 80 abut against the projecting piece 231 of the panel 11 and the sleeve 70 respectively, and the spring legs 91 of the second elastic member 90 abut against the panel 11 and the handle 30 respectively.

Figure 4:
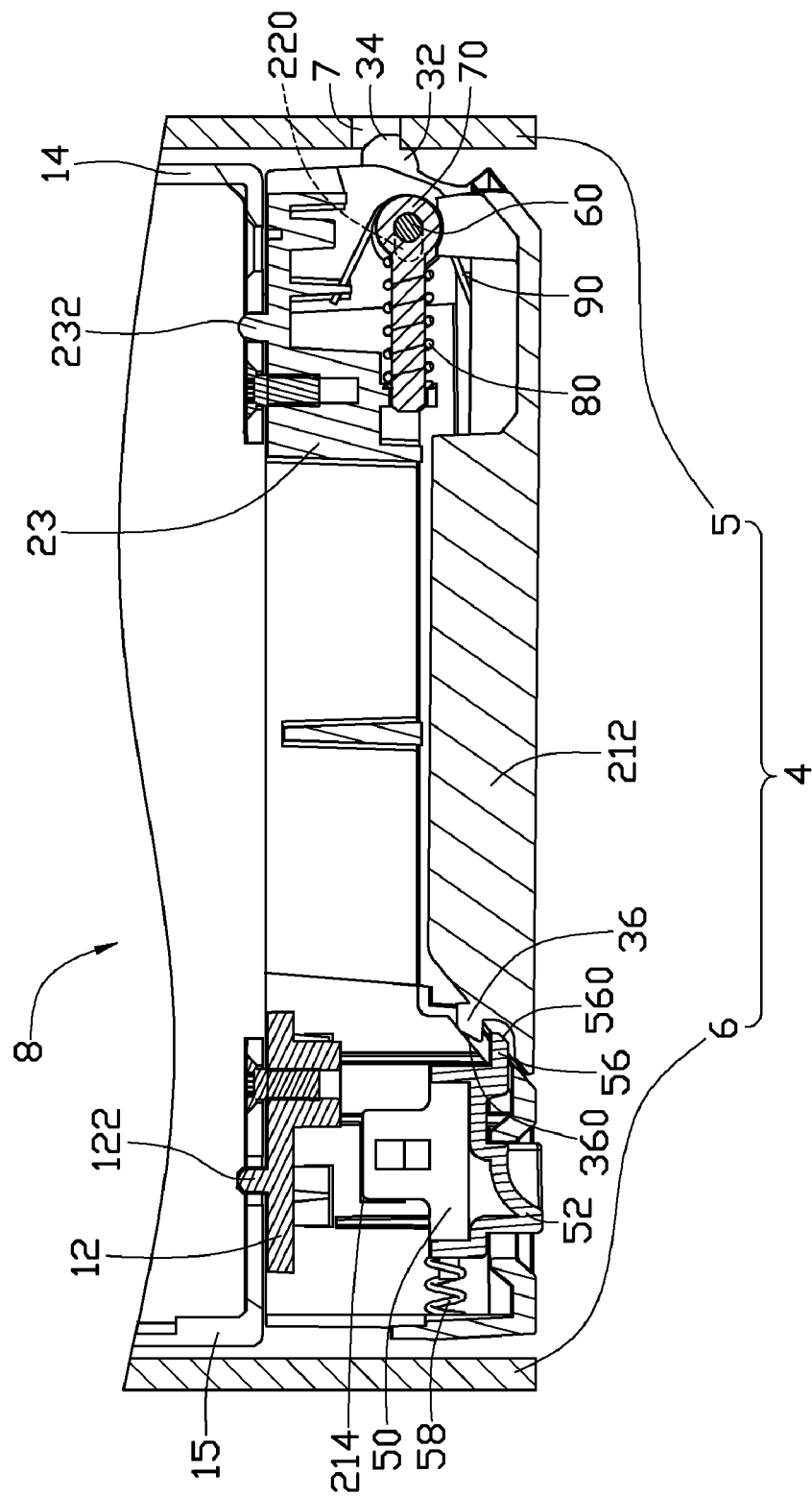
FIG. 4 is a cross-sectional view of the HDD holder of FIG. 3, showing in a locking state.

Referring to FIG. 4, in normal use of the HDD holder 8, the handle 30 is opened relative to the main body 10, via rotating around the spindle 60 (FIG. 4 shows the handle being closed). The HDD holder 8 is slid into a receiving portion 4 of a computer chassis, to completely receive the HDD holder 8 in the receiving portion 4. The handle 30 is rotated to the main body 10 to be closed. When the handle 30 is rotated to the main body 10, the first guiding surfaces 360 of the plurality of claws 36 of the handle 30 contact and engage with the second guiding surfaces 560 of the blocking piece 56 of the hook 50, to push the hook 50 to slide leftwards and thereby compressing the third elastic members 50, and until the plurality of claws 36 of the handle 30 goes over the blocking piece 56 of the hook 50, the elastic force of the third elastic members 50 push the hook 50 to slide back and therefore the blocking piece 56 of the hook 50 hooks the handle 30. The locking tongues 34 of the handle 30 extend into a locking hole 7 of a first sidewall 5 of the receiving portion 4, the first extension piece 31 and the second extension piece 32 of the handle 30 abut against an inner side of the first sidewall 5, and the second elastic member 90 is elastically deformed. Therefore, the HDD holder 8 is locked between the first sidewall 5 and a second sidewall 6 opposite to the first sidewall 5 of the receiving portion 4. It is noted that the first elastic member 80 supplies an elastic force to bias the sleeve 70 together with the spindle 60 and the handle 30 to right dead ends of the first elongated hole 210 and the second elongated hole 220.

In uninstalling the HDD holder 8, the operating portion 52 of the hook 50 is operated to be slid leftwards, to disengage the blocking piece 56 of the hook 50 from the plurality of claws 36 of the handle 30. Therefore, an elastic force of the second elastic member 90 can bias the handle 30 to rotate away from the main body 10 and thereby opening the handle 30. The locking tongues 34 of the handle 30 disengage from the locking hole 7 of the first sidewall 5 of the receiving portion 4. Therefore, the HDD holder 8 is ready to be removed from the receiving portion 4. It is noted that the projection 212 of the top board 21 of the main body 10 is configured to limit a rotation angle of the handle 30. When the handle 30 is opened, the first extension piece 31 will be blocked by the projection 212, such that the rotation angle of the handle 30 is limited between about 0-30 degrees.

In practice, a distance between the first and second sidewalls 5 and 6 of the receiving portion 4 usually has an error between plus or minus 1 millimeter (the error range is much less than lengths of the first elongated hole 210 and the second elongated hole 220). The handle 30 of the present disclosure is able to slide under the force of the first elastic member 80, such that the locking tongues 34 of the handle 30 are able to elastically engage in the locking hole 7 of the receiving portion 4 no matter how much distance between the first and second sidewalls 5 and 6 of the receiving portion 4. Therefore, the error of the distance can be offset.

Figure 5:
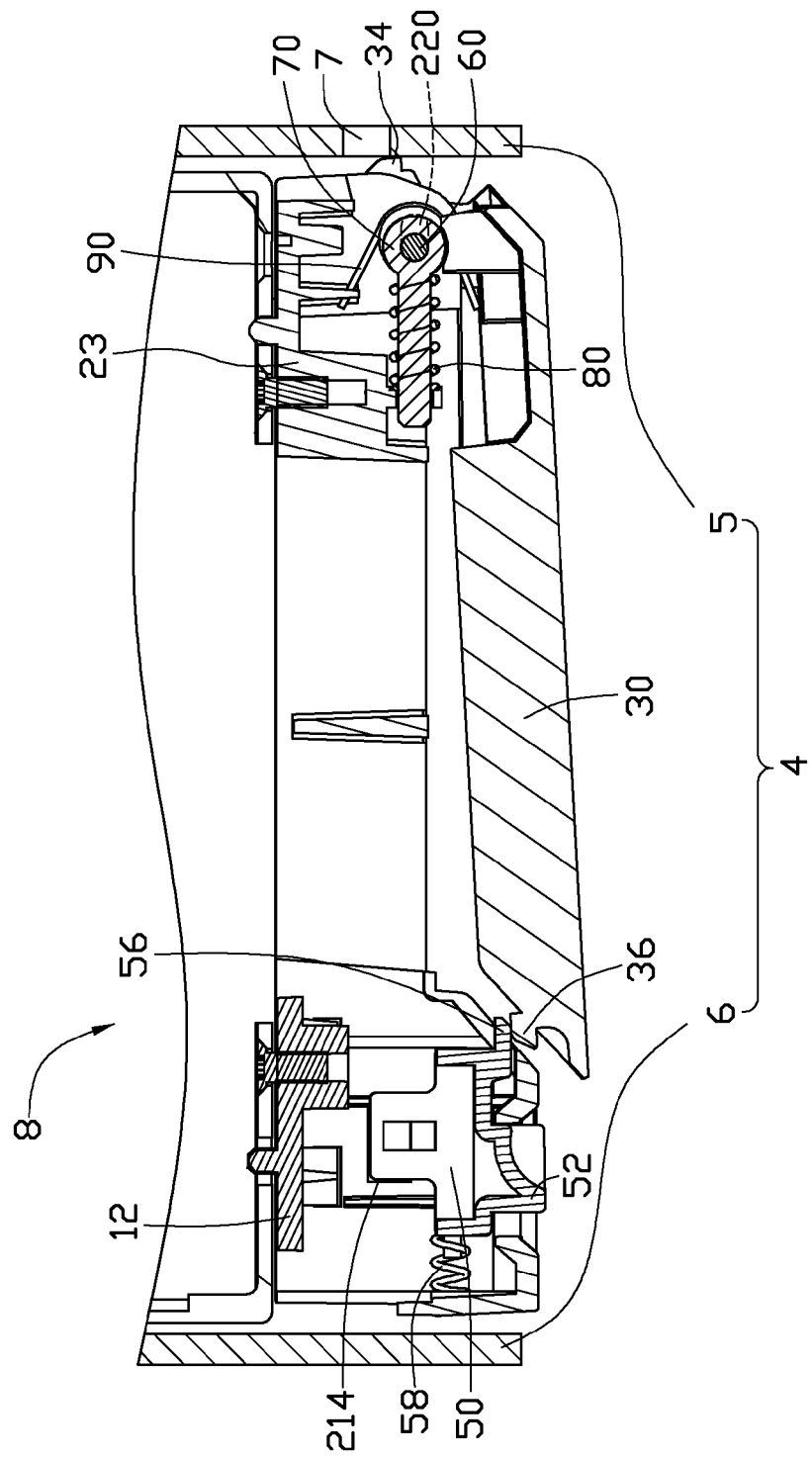
FIG. 5 is similar to FIG. 4, but showing in an unlocking state.

Referring to FIG. 5, the present disclosure has an innovative function that if the HDD holder 8 is not completely slid in the receiving portion 4, the handle 30 can not be closed, which is actually an alarm and can lead the user to assuredly push the HDD holder 8 in position to be locked. In detail, if the HDD holder 8 is not completely slid in the receiving portion 4, when the handle 30 is rotated towards the panel 11, the locking tongues 34 of the handle 30 will engage with the first sidewall 5 of the receiving portion 4 and thereby being compelled to move leftward. The handle 30 together with the plurality of claws 36 will slide leftward under the guiding of the first elongated hole 210 and the second elongated hole 220, wherein the spindle 60 is slid to left dead ends of the first elongated hole 210 and the second elongated hole 220. Therefore, when the plurality of claws 36 of the handle 30 is rotated to contact with the blocking piece 56 of the hook 50, the plurality of claws 36 will be stopped by the blocking piece 56 and cannot go over the blocking piece 56. Once the operation of the user stops, the handle 30 will be rotated away from the main body 10 by the second elastic member 90 to be opened. Accordingly, the present disclosure can prevent the user from making mistakes and thereby preventing the HDD holder 8 from been damaged by accident.

In other embodiments, the engagement between the spindle 60 and the sleeve 70 may be clearance fit, and the engagement(s) between the spindle 60 and the first pivot hole 313 and/or the second pivot hole 324 of the handle 30 may be interference fit.

In other embodiments, the first elastic member 80 may be a torsion spring whose two spring legs abut against the main body 10 and the sleeve 70, respectively. Another round raised portion like the raised portion 221 may extend from the main body 10 for the torsion spring to fit about.

In other embodiments, the sleeve 70 may be omitted, and the guiding post 71 may extend from the spindle 60. Furthermore, the guiding post 71 may be omitted, and a first portion of the spindle 60 that engages in the first elongated hole 210 and/or a second portion of the spindle 60 that engages in the second elongated hole 220 may be designed to have rectangular cross section to make the spindle 60 be slidable and not pivotable. If the guiding post 71 is omitted, the first elastic member 80 may be positioned in other ways. For example, a sleeve defining a through hole may be disposed, and the first elastic member 80 is received in the through hole with the opposite ends of the first elastic member 80 extending out of the through hole.

In other embodiments, the second elastic member 90 may be a pressure spring whose opposite ends abut against the main body 10 and the handle 30 respectively.

In other embodiments, only one of the third elastic members 58 may be employed and the other one may be omitted. The third elastic member 58 may be a pullback spring whose opposite ends connect with the hook 50 and a portion of the handle 30 located at a right side of the hook 50, respectively.

In other embodiments, one of the locking tongues 34 of the handle 30 may be omitted.

In other embodiments, only one of the plurality of claws 36 of the handle 30 may be employed and the other claws 36 may be omitted.

It is to be understood, however, that even though numerous characteristics and advantages of the disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A hard disk drive holder comprising:
a main body;
a spindle slidably mounted to the main body and slidable between a first position and a second position;
a handle rotatably connected to the main body via the spindle, wherein the handle comprises a covering board, a claw extending from the covering board, and a locking tongue extending from the covering board, the handle moves between a closed position where the covering board covers the main body, and an opened position where the covering board is away from the main body, wherein when the handle is at the closed position, if the spindle is slid from the first position to the second position, the locking tongue gradually extends outside from a side of the main body;
a hook slidably mounted to the main body and slidable between a third position and a fourth position, the hook comprising a main piece and a blocking piece extending from the main piece, wherein when the handle is rotated from the opened position to the closed position, if the spindle is not at the first position, the claw of the handle engages with the blocking piece of the hook and compels the hook to slide from the third position towards the fourth position until the claw goes over the blocking piece, and if the spindle is at the first position, the claw is stopped by and unable to go over the blocking piece;
a first elastic member to bias the spindle to tend to slide to the second position;
a second elastic member to bias the handle to tend to rotate to the opened position; and
a third elastic member to bias the hook to tend to slide to the third position.

2. The hard disk drive holder of claim 1, wherein the main body comprises opposite top and bottom boards, a first elongated hole is defined in the top board, a second elongated hole is defined in the bottom board, and a longitudinal axis of the second elongated hole is parallel with a longitudinal axis of the first elongated hole, the spindle is slidably engaged in the first elongated hole and the second elongated hole along the longitudinal axes of the first and second elongated holes so as to slide between the first position and the second position.

3. The hard disk drive holder of claim 2, wherein opposite first and second extension pieces extend from the handle, a round first pivot hole is defined in the first extension piece, a round second pivot hole is defined in the second extension piece, the spindle extends in the first pivot hole and the second pivot hole so as to rotatably connect the handle to the main body.

4. The hard disk drive holder of claim 2, wherein a third elongated hole is defined in each of the top and bottom boards, a longitudinal axis of each third elongated hole is parallel with the longwise direction of the panel, the hook further comprises two sliding blocks extending from the main piece corresponding to the third elongated holes, the sliding blocks are slidably received in the third elongated holes along the longitudinal axes of the third elongated holes so as to slide between the third position and the fourth position.

5. The hard disk drive holder of claim 1, further comprising a sleeve fitting about the spindle, the first elastic member is a pressure spring whose opposite ends abut against the main body and the sleeve, respectively, so as to bias the spindle.

6. The hard disk drive holder of claim 5, wherein a guiding hole is defined in the main body, a guiding post extends from the sleeve to enter the guiding hole, and the first elastic member is fitted about the guiding post.

7. The hard disk drive holder of claim 1, wherein the second elastic member is a torsion spring whose two spring legs abut against the main body and the handle, respectively, so as to bias the handle.

8. The hard disk drive holder of claim 7, wherein a raised portion extends from the main body, and the second elastic member is fitted about the raised portion.

9. The hard disk drive holder of claim 1, wherein the third elastic member is a pressure spring whose opposite ends abut against the main body and the hook, respectively, so as to bias the hook.

10. The hard disk drive holder of claim 9, wherein the hook further comprises a holding pole extending from the main piece opposite to the blocking piece, and the third elastic member is fitted about the holding pole.

11. The hard disk drive holder of claim 10, wherein the hook further comprises an operating portion extending from the main piece, the operating portion is able to be operated to slide the hook.

12. The hard disk drive holder of claim 1, wherein the claw of the handle comprises a slanting first guiding surface, the blocking piece of the hook comprises a slanting second guiding surface, wherein when the handle is rotated to the closed position, the claw compels the hook to slide via an engagement between the first guiding surface and the second guiding surface.

13. A hard disk drive holder comprising:
a main body comprising an elongated panel, a first arm fixed to a right end of the panel and extending backward, and a second arm fixed to a left end of the panel opposite to the first arm;
a spindle slidably mounted to a front of the right end of the panel, wherein the spindle is slidable along a longwise direction of the panel between a first position and a second position;
a handle comprising opposite right and left ends, wherein a claw extends from the left end of the handle, the right end of the handle is rotatably connected to the right end of the panel via the spindle, a locking tongue extends from the right end of the handle away from the left end of the handle, the handle moves between a closed position where the handle covers the main body, and an opened position where the left end of the handle is away from the main body;
a hook slidably mounted in the panel adjacent to the left end of the panel and slidable between a third position and a fourth position, the hook comprising a main piece and a blocking piece extending from a right side of the main piece, wherein when the handle is rotated from the opened position to the closed position, upon a condition that the spindle is not at the first position, the claw of the handle engages with the blocking piece of the hook and compels the hook to slide from the third position towards the fourth position until the claw goes over the blocking piece;
a first elastic member to bias the spindle to tend to slide to the second position;
a second elastic member to bias the handle to tend to rotate to the opened position; and
a third elastic member to bias the hook to tend to slide to the third position.

14. The hard disk drive holder of claim 13, wherein the panel comprises opposite top and bottom boards, a first elongated hole is defined in the top board, a second elongated hole is defined in the bottom board, and longitudinal axes of the first and second elongated holes are parallel with the longwise direction of the panel, the spindle is engaged in the first elongated hole and the second elongated hole and is slidable along the longitudinal axes of the first and second elongated holes so as to slide between the first position and the second position.

15. The hard disk drive holder of claim 14, wherein opposite first and second extension pieces extend from the right end of the handle, a round first pivot hole is defined in the first extension piece, a round second pivot hole is defined in the second extension piece, the spindle extends in the first pivot hole and the second pivot hole so as to rotatably connect the handle to the main body.

16. The hard disk drive holder of claim 15, wherein a projection extends from the top board of the panel adjacent to the right end of the panel and located between the first elongated hole and the first arm, when the handle is rotated to be opened, the projection blocks the first extension piece to limit a rotation angle of the handle between about 0-30 degrees.

17. The hard disk drive holder of claim 14, wherein a third elongated hole is defined in each of the top and bottom boards, a longitudinal axis of each third elongated hole is parallel with the longwise direction of the panel, the hook further comprises two sliding blocks extending from the main piece corresponding to the third elongated holes, the sliding blocks are slidably received in the third elongated holes along the longitudinal axes of the third elongated holes so as to slide between the third position and the fourth position.

18. The hard disk drive holder of claim 17, wherein the handle further comprises a sidewall connected between the top board and the bottom board at the left end of the handle, the third elastic member is a pressure spring whose opposite ends abut against the main body and the hook, respectively, so as to bias the hook.

19. The hard disk drive holder of claim 17, wherein the claw of the handle comprises a slanting first guiding surface at a left end of the claw, the blocking piece of the hook comprises a slanting second guiding surface at a right end of the blocking piece, wherein when the handle is rotated to the closed position, the claw compels the hook to slide via an engagement between the first guiding surface and the second guiding surface.

20. The hard disk drive holder of claim 13, wherein the main body further comprises a rear cover detachably mounted to a rear side of the panel, the second arm comprises an elongated main portion and a mounting portion extending from an end of the main portion, an elongated locating hole and a round through hole are defined in the mounting portion, a longitudinal axis of the elongated locating hole is parallel with the longitudinal axis of the panel, a locating pole extends backwards from the rear cover into the elongated locating hole of the mounting portion, a mounting hole is defined in the rear cover, a fastener is extended through the through hole and engaged in the mounting hole so as to fixed the second arm to the panel.

* * * * *